(No Model.)
P. DE LORIA.
HOOF SPREADER.
No. 596,397. Patented Dec. 28, 1897.
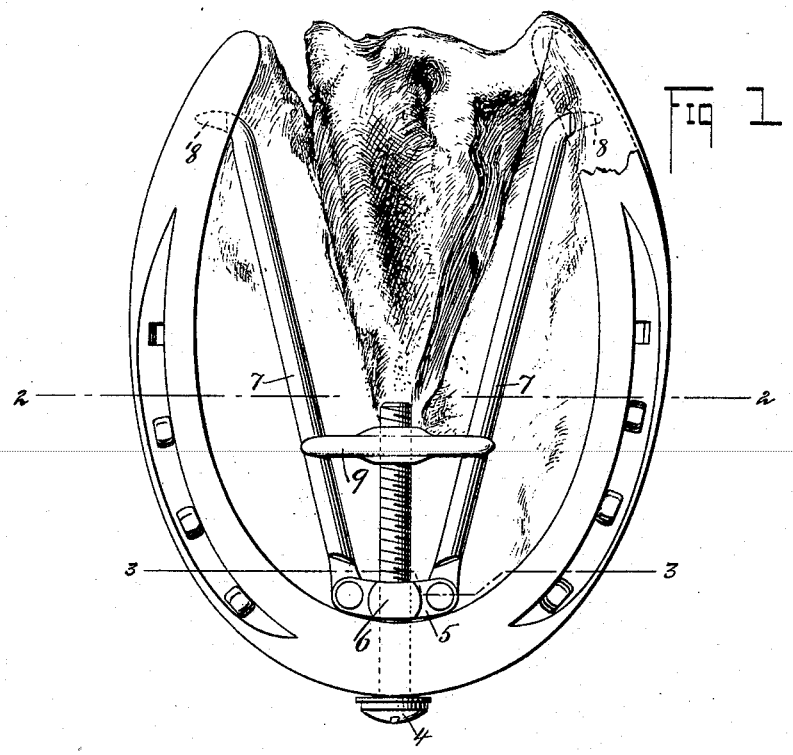
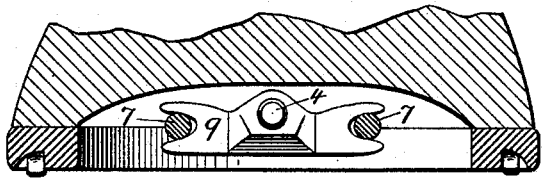
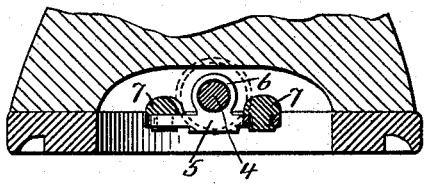
WITNESSES:
INVENTOR
P. De Loria.
BY
ATTORNEYS.

UNITED STATES PATENT OFFICE.

PHILIP DE LORIA, OF LAKE PLACID, NEW YORK.

HOOF-SPREADER.

SPECIFICATION forming part of Letters Patent No. 596,397, dated December 28, 1897.

Application filed October 16, 1897. Serial No. 655,418. (No model.)

*To all whom it may concern:*

Be it known that I, PHILIP DE LORIA, of Lake Placid, in the county of Essex and State of New York, have invented a new and Improved Hoof-Spreader, of which the following is a full, clear, and exact description.

This invention is a device for spreading horses' hoofs by means of two arms engaging the quarters of the hoof and provided with means by which they may be spread to act on the hoof.

This specification is the disclosure of one form of my invention, while the claims define the actual scope of the invention.

Reference is to be had to the accompanying drawings, forming a part of this specification, in which similar characters of reference indicate corresponding parts in all the figures.

Figure 1 is a plan view of the invention. Fig. 2 is a sectional view on the line 2 2 of Fig. 1, and Fig. 3 is a sectional view on the line 3 3 of Fig. 1.

The expander has a screw 4 revolubly mounted in the toe of the hoof and ranging longitudinally directly above the shoe, the head of the screw being at the front of the toe of the hoof. Bearing against the inner side of the toe of the shoe and having the screw passed loosely through an eye 6 thereof is a block 5. To the ends of the block 5 arms 7 are respectively pivoted. The arms 7 extend rearward and outward and have at their free ends spurs 8, that respectively engage the quarters of the hoof.

The screw 4 is capable of turning loosely within the hoof and within the eye 6. Working on the threaded portion of the screw is a cross-head 9 with forked edges respectively in sliding connection with the arms 7. As the screw 4 is turned in the hoof and in the block 5 the cross-head 9 is moved forward and rearward, so that the spreading pressure on the arms 7 may be regulated. By these means the hoof may be spread at its quarters. This will cure the hoof of abnormal contraction.

Having thus described my invention, I claim as new and desire to secure by Letters Patent—

1. The combination of a screw adapted to be mounted loosely in the toe of a horse's hoof, and to extend longitudinally of the hoof, a block adapted to bear against the inner portion of the toe of the shoe and having the screw passed loosely therethrough, two arms pivoted to the block and respectively adapted to engage the quarters of the hoof, and a cross-head threaded on the screw and having sliding connection with the arms.

2. The combination of a screw adapted to be mounted loosely in a horse's hoof, a block adapted to bear against the horseshoe, two arms pivoted to the block and respectively adapted to engage the quarters of the horse's hoof, and a cross-head having threaded connection with the screw and having sliding connection with the arms.

3. The combination of a screw adapted to be mounted loosely in the toe of a horse's hoof and arranged longitudinally of the same, a block adapted to bear against the inner side of the toe of the shoe and having an eye loosely receiving the screw, an arm pivoted to each end of the block, the arms extending rearward and being adapted respectively to engage the quarters of the hoof, and a cross-head threaded on the screw and having sliding connection with the arms.

PHILIP DE LORIA.

Witnesses:
JOHN A. STEVENS,
PAUL COTY.